United States Patent [19]

Waragai et al.

[11] 4,446,185

[45] May 1, 1984

[54] REACTION INJECTION MOLDED ARTICLE WITH THREADS AND METHOD OF MOLDING SAME

[75] Inventors: Kenichi Waragai, Fujisawa; Masao Gotoh, Yokosuka; Hitoshi Yokono; Kazumi Iijima, both of Katsuta, all of Japan

[73] Assignee: Hitachi, Ltd., Tokyo, Japan

[21] Appl. No.: 355,456

[22] Filed: Mar. 8, 1982

[30] Foreign Application Priority Data

Mar. 13, 1981 [JP] Japan .................................. 56-35429
Apr. 28, 1981 [JP] Japan .................................. 56-63348

[51] Int. Cl.$^3$ ............................................. B32B 3/24
[52] U.S. Cl. ........................................ 428/67; 428/158; 428/162; 428/218; 428/219; 428/318.8; 52/309.9; 411/178; 411/907; 411/908
[58] Field of Search ............... 411/82, 178, 904, 907, 411/908; 264/45.5; 428/158, 162, 218, 318.8, 67, 219; 52/309.8, 309.9

[56] References Cited

U.S. PATENT DOCUMENTS 4,283,898  8/1981  Claver ........................ 52/309.9 X

*Primary Examiner*—Alexander Thomas
*Attorney, Agent, or Firm*—Antonelli, Terry & Wands

[57] ABSTRACT

A reaction injection molded article formed with threads and a method of molding same, wherein threaded members, such as threaded inserts, helicoils, etc., are positioned in the cavity of a reaction injection mold, and molding material is injected into the cavity to form the threaded members into a unitary structure with a body of the reaction injection molded article. The threaded members are securedly held in place by a surface layer of relatively high density. The molding material is a mixture of an A liquid and a B liquid, the A liquid containing 100 weight parts of polyether polyol obtained by adding alkylene oxide to various kinds of alcohol or amine, 1-5 weight parts of a reaction promoting agent (catalyst) comprising tertiary amines, tin compounds, etc., 3-50 weight parts of water and a foaming agent, such as low boiling point alkylhalide, 1-5 weight parts of a foaming regulating agent, such as alkylene oxide denatured polydimethyl siloxane and 1-20 weight parts, if necessary, of pigment, dyestuff and filler, such as carbon black, diazo compound, silica, glass fiber, etc., and the B liquid containing 100-200 weight parts of MDI, TDI, crude MDI or crude TDI.

15 Claims, 23 Drawing Figures

*CHARGING RATE IS 100% WHEN THE POURED VOLUME IS EQUAL TO THE VOLUME OF THE MOLD CAVITY.

| SHAPE OF THREADED INSERT | SCREW CLAMPING CRITICAL TORQUE (Kg-cm) |
|---|---|
| THREADED OUTER PERIPHERY | ▨▨▨▨▨ 60 |
| KNURLED OUTER PERIPHERY (WITH GROOVES) | ▨▨▨▨ 55 |
| SQUARE OUTER PERIPHERY (WITH GROOVES) | ▨▨▨▨▨▨▨ 80 |
| HEXAGONAL OUTER PERIPHERY (WITH GROOVES) | ▨▨▨▨▨▨▨ 75 |

REACTION INJECTION MOLDED ARTICLE WITH THREADS AND METHOD OF MOLDING SAME

BACKGROUND OF THE INVENTION

This invention relates to reaction injection molded articles and methods of forming such molded articles, and more particularly it is concerned with a reaction injection molded article formed with threads and a method of forming such molded article.

Heretofore, in the art of producing reaction injection molded articles (hereinafter molded articles), such as foamed urethane molded articles, methods stated as follows have been known for clamping associated parts to the molded articles:

1. Following making of holes in the molded article, tapping and threading of bolts are performed for securing parts.
2. Self-tapping of the molded article is effected for securing parts.
3. Holes are made through the molded article, and parts are secured in place by means of a backing strip and bolts.
4. Following making of holes in the molded article and tapping, helicoils are fitted and bolts are threadably connected to secure parts in place.

Of the aforesaid four methods known in the art, the third method capable of providing a relatively high screw clamping critical torque or a maximum clamping torque capable of clamping the part without damaging the molded article and the threads formed therein is most popular and usually used.

However, this method suffers the disadvantage that when clamping is carried out the backing strip might be forced against the molded article to cause same to buckle and sufficiently high clamping strength could not be obtained. An added trouble is that this method cannot be used for producing containers that must be hermetically closed because of the need to make through holes therein when the molded article is produced.

SUMMARY OF THE INVENTION

This invention has been developed for the purpose of obviating the aforesaid disadvantages of the prior art. Accordingly the invention has as its object the provision of a reaction injection molded article formed with threads having high screw clamping strength and a method of producing such molded article which has its process steps minimized.

One of the outstanding characteristics of the invention is that the reaction injection molded article formed with threads comprises a molded article body, such as a foamed urethane body, formed with holes enclosed by a surface layer of relatively high density, such as a skin layer, and members formed with female threads inserted in the holes and held in place by the surface layer.

Another outstanding characteristic is that the method of molding a reaction injection molded article formed with threads according to the invention is that members formed with threads are positioned in the cavity of a reaction injection mold and a urethane foaming material composed of an A liquid and a B liquid is injected into the cavity. The A liquid contains 100 weight parts of polyether polyol obtained by adding alkylene oxide to various kinds of alcohol and amine, 1-5 weight parts of a reaction promoting agent (catalyst) comprising tertiary amines, tin compounds, etc., 3-50 weight parts of water and a foaming agent, such as low boiling point alkylhalide, 1-5 weight parts of a foaming regulating agent, such as alkylene oxide denatured polydimethl siloxanie and 1-20 weight parts, if necessary, of pigment, dyestuff and filler, such as carbon black, diazo compound, silica, glass fiber, etc., and the B liquid contains 100-200 weight parts of MDI, TDI, crude MDI or crude TDI. The members formed with threads can be formed into a unitary structure with the body of the molded article and securedly held in place by a surface layer of relatively high density (0.7–1.0 g/cm$^3$), such as skin layer.

DESCRIPTION OF THE PREFERRED EMBODIMENTS

Figure 1:
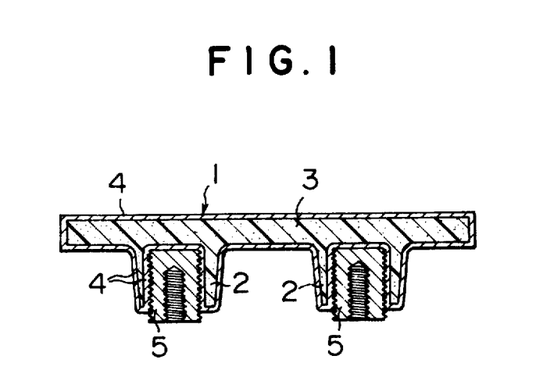
FIG. 1 is a sectional view of the reaction injection molded article formed with threads comprising one embodiment of the invention.

FIG. 1 shows a first embodiment of the invention in which the numeral 1 designates a body of a reaction injection molded article formed with threads, such as a foamed urethane molded article, formed of material (raw material liquid) composed of an A liquid and a B liquid, the A liquid containing 100 weight parts of polyether polyol obtained by adding alkylene oxide to various kinds of amine or alcohol, 1-5 weight parts of a reaction promoting agent (catalyst) comprising tertiary amines, tin compounds, etc., 8-30 weight parts of a foaming agent of low boiling point (30°-70° C. at pressure 1-3 kg/cm$^2$), such as trichlorofluoromethane and 0.5-1.0 weight part of water and the B liquid containing 100-200 weight parts of MDI (methylene dipara-phenylene isocyanate), TDI (toluene diisocyanate), crude MDI or crude TDI. The body 1 of the molded article includes bosses 2, a core 3 and a skin layer 4 of high strength. The numeral 5 designates threaded members or threaded inserts which are embedded in the bosses 2 of the molded article body 1 and securedly attached to the skin layer 4. The mechanism of forming the skin layer 2 will be described. As the A liquid and B liquid are injected into a mold cavity at high pressure (about 200 kg/cm$^2$) while impinging on each other and mixing with each other, they begin to react with each other and the heat of reaction causes the temperature to rise to 70°-150° C., so that the low boiling point foaming agent begins to evaporate to fill the cavity with foamed material. At this time, the foamed material in contact with the mold cavity surface and the insert surface is cooled by the mold and the insert to cause condensation of the vaporized low boiling foaming agent, so that the material becomes almost foamless and constitutes the skin layer 4.

Figure 15:
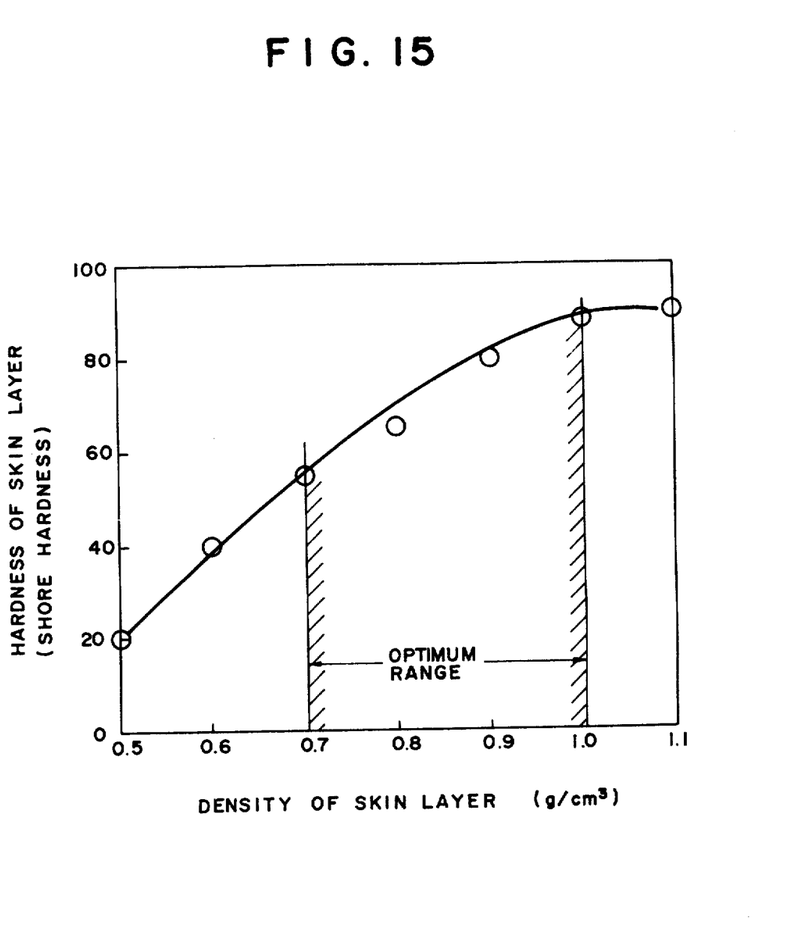
FIG. 15 is a graph showing the relation between the density of the skin layer and the hardness of the skin layer.

The skin layer 4 has a density of 0.5-1.1 g/cm$^3$ which is higher than the density 0.05-0.2 g/cm$^3$ of the core 3 formed by the inwardly disposed material. The higher the density of the skin layer 4, the higher becomes its strength (hardness). FIG. 15 shows the relation between them. The skin layer 4 of high strength can be produced when the proportions of the low boiling foaming agent and the catalyst in the raw material are high and when the charging rate is high and the temperature of the mold and the insert is low. FIGS. 16-19 show these relations.

Figure 2:
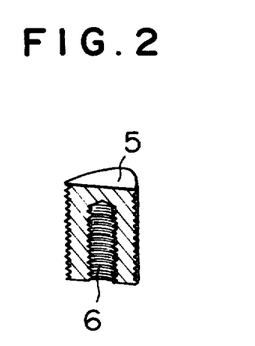
FIG. 2 is a perspective view, on an enlarged scale with certain parts being shown in section, of the threaded insert used in the embodiment shown in FIG. 1.

The threaded inserts 5 are each substantially cylindrical in shape and formed of steel. As shown in FIG. 2, each threaded insert 5 is formed with a female thread on the inside as indicated at 6 and a male thread on the outside.

The reaction, injection molded article formed with threads constructed as aforesaid according to the invention has high bond strength between the threaded inserts 5 and the molded article body 1 because the skin layer 4 of high hardness is formed in the vicinity of the outer side of the threaded inserts 5 and bites into the threaded surfaces of the inserts 5. Thus the molded article according to the invention has a screw clamping critical torque and a thrust (resistance offered by the threaded insert against an axial force when the screw is clamped) higher than those of the prior art.

Figure 3:
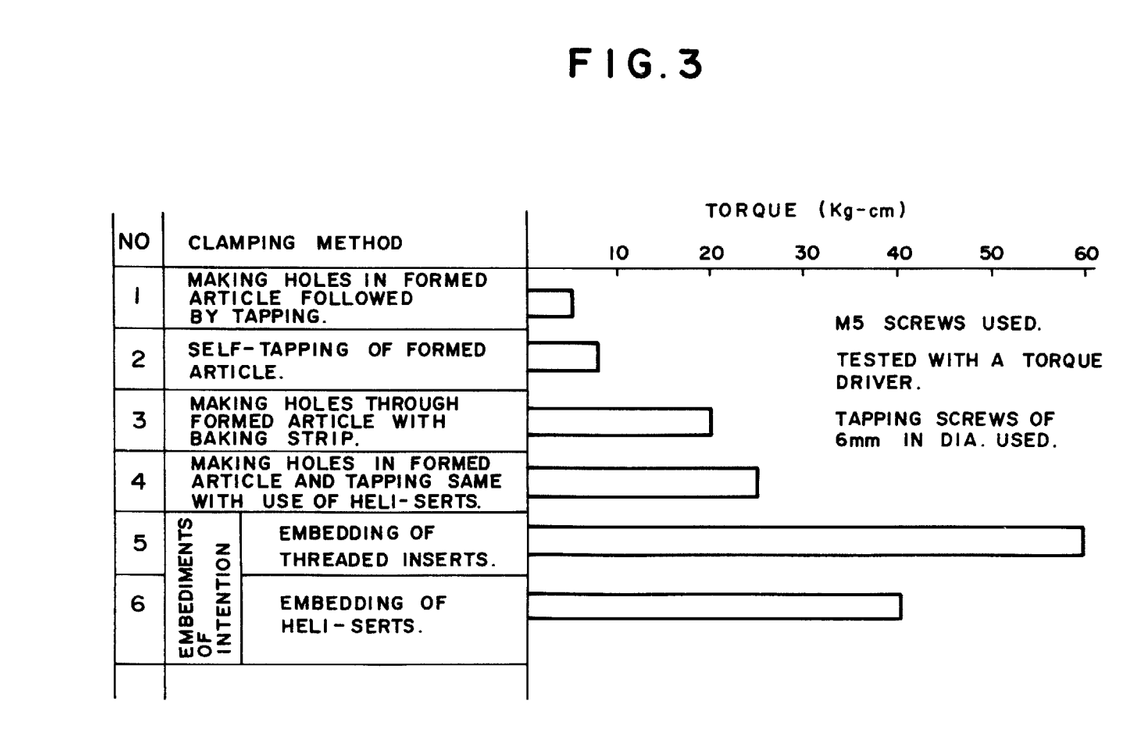
FIG. 3 is a graph showing the embodiments of the invention in comparison with the prior art with respect to the screw clamping critical torque.

The embodiment of the invention shown in FIG. 1 has a screw clamping critical torque of 60 kg-cm (M$_6$ screw used), which compares favorably with those of the prior art, as shown in FIG. 3 which is a graph showing a comparison of the embodiments of the invention with the prior art with respect to the screw clamping critical torque. In FIG. 3, specimens 1-4 are molded articles of the prior art and specimen 5 is the embodiment shown in FIG. 1 while specimen 6 is another embodiment subsequently to be described. In measuring the screw clamping critical torques, Japanese Industrial Standard (JIS) M$_6$ screws and tapping screws of 6 mm in diameter were used with a torque driver.

As can be clearly seen in the graph of FIG. 3, it will be understood that the screw clamping critical torque exhibited by specimen 5 or the molded article according to the invention is three times as high as that of specimen 3 or the molded article of the prior art which is 20 kg-cm.

Figure 4A:
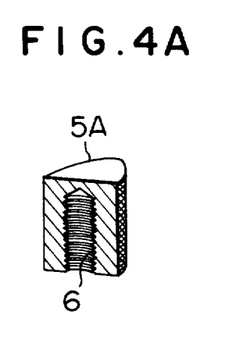
FIGS. 4a, 4b and 4c are perspective views, with certain parts being shown in section, of modifications of the insert shown in FIG. 2.
Figure 4B:
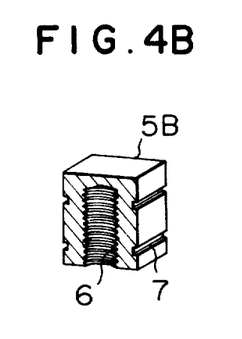
Figure 4C:
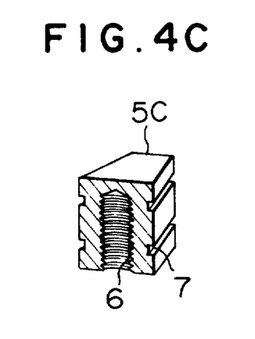
Figure 20:
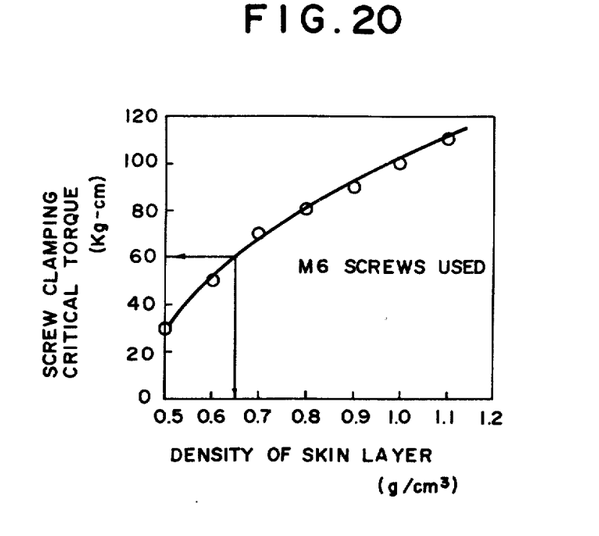
FIG. 20 is a graph showing the relation between the density of the skin layer and the screw clamping critical torque.
Figure 21:
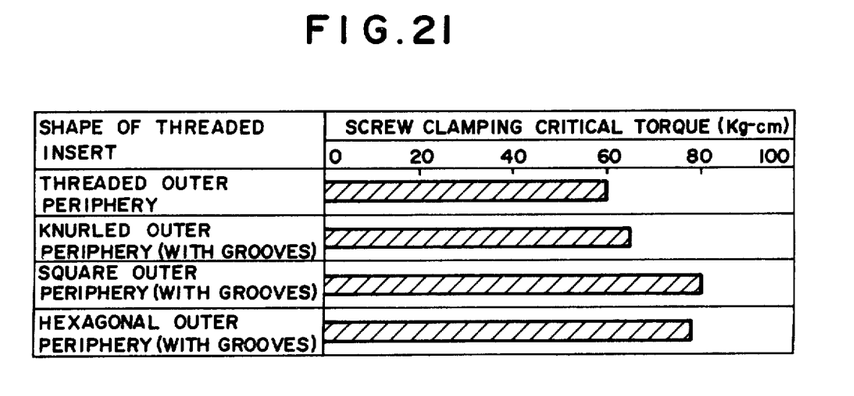
FIG. 21 is a graph showing the relation between the shape of the threaded insert and the screw clamping critical torque.

Additionally the molded article according to the invention offers the advantage that the process steps to be followed in production can be reduced as compared with those of the prior art because no piercing operation is required following molding. The relation between the screw clamping critical torque and the density of the skin layer secured to the outer periphery of the inserts in the embodiment shown in FIG. 1 is as shown in FIG. 20. As can be seen in the graph of FIG. 20, the higher the density of the skin layer secured to the outer periphery of the inserts, the higher is the screw clamping critical torque. For example, when a screw clamping critical torque of 60 kg-cm or more is required, one has only to obtain the skin layer of over 0.65 g/cm$^3$ in density. The embodiment shown in FIG. 1 uses the threaded insert 5 shown in FIG. 2. However, the invention is not limited to this specific form of insert and threaded inserts 5A, 5B and 5C shown in FIGS. 4A, 4B and 4C respectively may be used in place of the threaded insert 5 shown in FIG. 2. The inserts 5A, 5B and 5C are all formed of steel. The threaded insert 5A shown in FIG. 4A is formed on the inside with a female thread at 6 while its outside is columnar and knurled. Like the threaded insert 5 shown in FIG. 2, the threaded insert 5A has the effect of increasing the screw clamping critical torque and the thrust. The threaded inserts 5B and 5C shown in FIGS. 4B and 4C respectively are formed on the inside with female threads at 6 while they are polygonal or square and hexagonal respectively on the outside with peripheral (e.g., lateral) grooves 7 being formed thereon. The provision of the polygonal outside enables the threaded insert to resist rotation at the corners to thereby increase the screw clamping critical torque over that of the threaded inserts 5 and 5A, and the provision of the peripheral grooves 7 increases the thrust over that of the threaded inserts 5 and 5A. FIG. 21 shows the relation between the shape of the threaded inserts and the screw clamping critical torque. The threaded inserts 5, 5A, 5B and 5C have been described as being formed of steel. However, the material is not limited to steel and other metal, such as brass, hard aluminum, etc., may be used because of the needs to increase the strength of the thread and to facilitate molding as subsequently to be described.

The method of molding the foamed urethane molded article formed with threads as shown in FIG. 1 will now be described by referring to FIG. 5 in which the numerds 8 and 9 designate an upper mold member and a lower mold member respectively of a reaction injection mold. The lower mold member 9 formed with recesses 9A cooperates with the upper mold member 8 to define therebetween a cavity 10 including boss forming regions 10A. The numeral 11 designates an after mixer through which material for producing a molded article is injected into the cavity 10. The threaded inserts 5 are fixedly placed in the boss forming regions 10A of the cavity 10 as their open ends are inserted in the recesses 9A formed in the lower mold member 9. Thus when the molding material is injected into the cavity 10, the material is prevented from invading the female thread 6 of each threaded insert 5.

Figure 16:
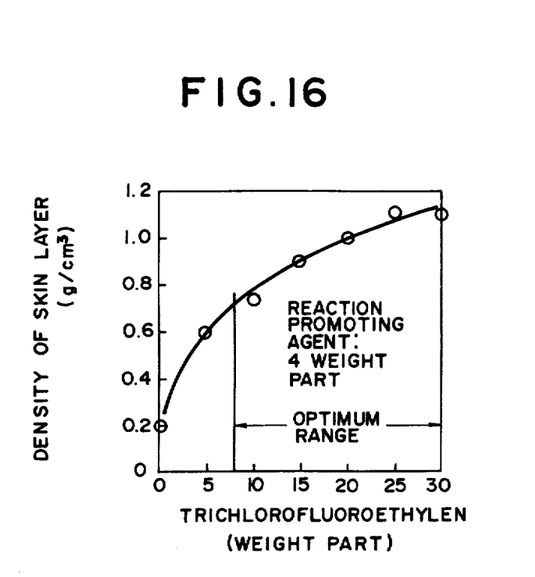
FIG. 16 is a graph showing the relation between trichclorofluoromethane and the density of the skin layer.
Figure 17:
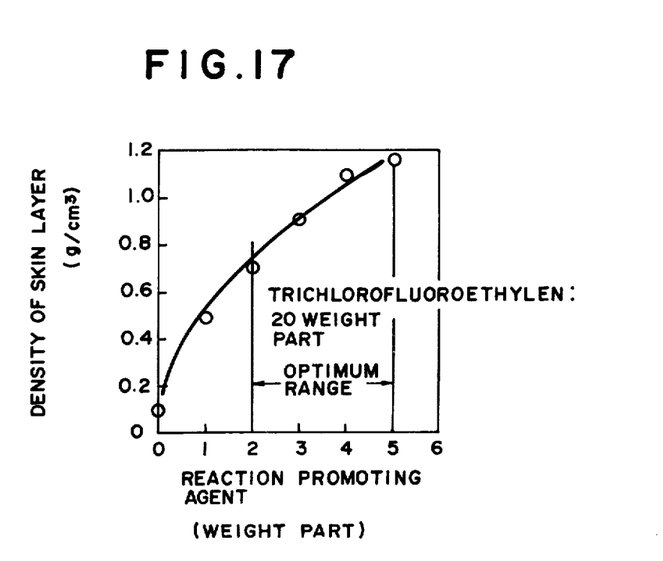
FIG. 17 is a graph showing the relation between the reaction promoting agent and the density of the skin layer.
Figure 18:
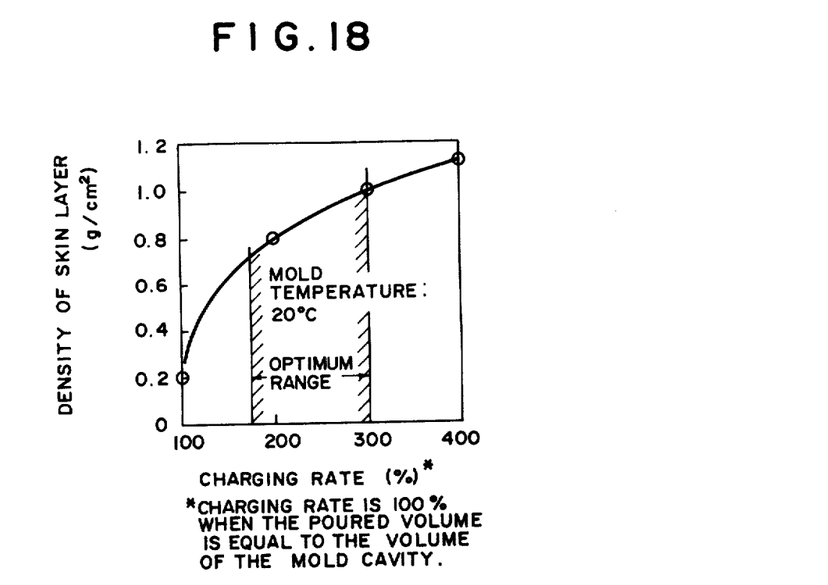
FIG. 18 is a graph showing the relation between the charging rate and the density of the skin layer.
Figure 19:
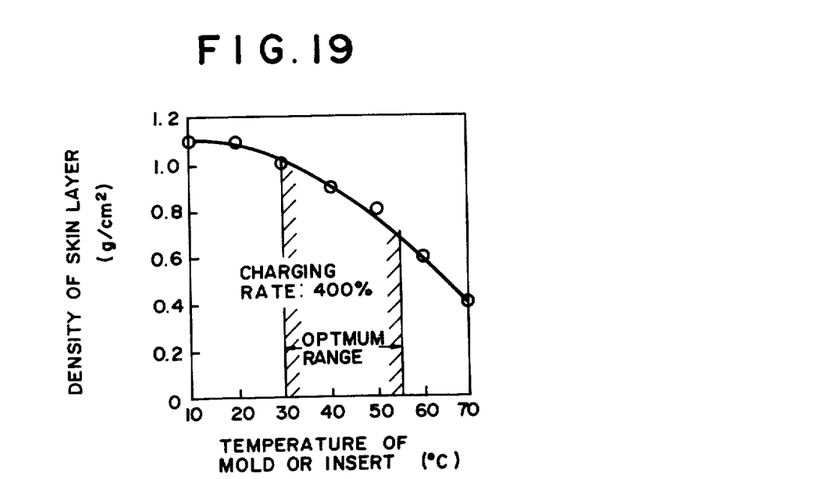
FIG. 19 is a graph showing the relation between the temperature of the mold or the insert and the density of the skin layer.

Molding material or a mixture of the A liquid and the B liquid is injected through the after mixer 11 into the cavity 10. The molding material is composed of the A liquid containing 100 weight parts of polyether polyol obtained by adding alkylene oxide to various kinds of alcohol or amine, 1–5 weight parts of a reaction promoting agent (catalyst) comprising tertiary amines, tin compounds, etc., 8–30 weight parts of a foaming agent of low boiling point (30°–70° C./1–3 kg/cm$^2$), such as trichlorofluoromethane and 0.5–1.0 weight part of water, and the B liquid containing 100–200 weight parts of MDI, TDI, crude MDI or crude TDI. Upon being injected into the cavity 10, the ingredients of the molding material react with one another in the cavity 10 to foam and set, before being cooled by the upper mold member 8, lower mold member 9 and threaded inserts 5 to produce a foamed urethane molded article formed with threads comprising, as shown in FIG. 1, the core 3 in the interior of the body 1 and the strong skin layer 4 on the surface of the body 1 and at the outer periphery of each threaded insert 5. The strong skin layer 4 can be obtained by increasing the density thereof. It is the reaction promoting agent and the foaming agent of the material composition that exert the greatest influence on the density of the skin layer. FIGS. 16 and 17 show the relation between them. The open end of each threaded insert 5 extends from the boss 3 of the molded article body 1 an amount corresponding to the depth of the recesses 9A formed in the lower mold member 9.

In producing a molded article, the threaded inserts 5 formed of steel having a high thermal conductivity are used. Owing to the temperature difference between the reaction temperature of the resin in the boss forming regions 10A and the temperature of the threaded inserts 5, the material surrounding the periphery of each threaded insert 5 is cooled quickly to enable the skin layer 4 of a small thickness and high strength or hardness to be formed outside each threaded insert 5.

Thus the foamed urethane molded article formed with threads produced as aforesaid has a high screw clamping critical torque and a high thrust.

Figure 6:
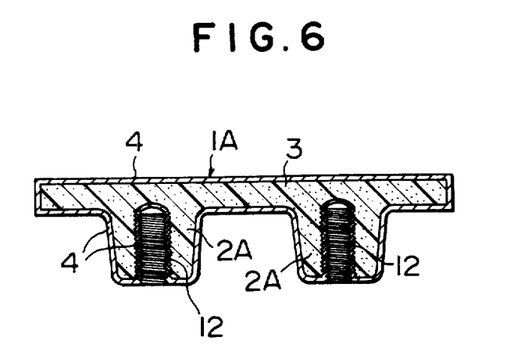
FIG. 6 is a sectional view of the molded article comprising another embodiment of the invention.

FIG. 6 shows another embodiment of the reaction injection molded article formed with threads, such as a foamed urethane molded article, in conformity with the invention, in which the body 1A of the molded article is formed with the bosses 2A. The numeral 12 designates members formed with threads or helicoils which are each embedded in the interior of one of the bosses 2A of the body 1A by being securedly held in place by the skin layer 4.

The helicoils 12 formed of steel are bellows-like resilient members which are commercially available with a trade name of HELI-SERT manufactured and sold by Tsugami Corporation of Japan.

The foamed urethane molded article body 1A formed with threads of this embodiment shown in FIG. 6 has high bond strength between each helicoil 12 and the body 1A because the skin layer 4 of high hardness is formed in the vicinity of each helicoil 12 and the resin bites into the outer side (threaded side) of each helicoil 12. The numeral 3 is the core.

As represented by specimen 6 shown in FIG. 3, the embodiment shown in FIG. 6 has a screw clamping critical torque of 40 kg-cm (using $M_6$ screws) which, although it lags behind that of specimen 5 representing the embodiment shown in FIG. 1, is twice as high as 20 kg-cm of specimen 3 of the prior art.

The molded article shown in FIG. 6 uses helicoils (HELI-SERT, for example) which are commercially available, as members formed with threads. The embodiment shown in FIG. 6 offers the additional advantage of being lower in the number of process steps than the embodiment shown in FIG. 1 which uses the threaded inserts 5 as members with threads.

Figure 8:
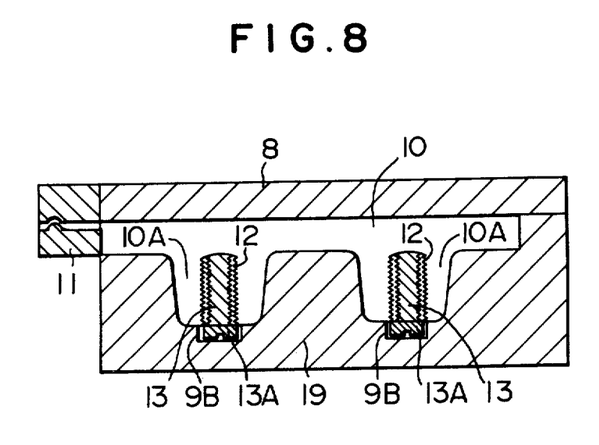
FIG. 8 is a sectional view of the mold used for producing the molded article shown in FIG. 6.

The method of production of the foamed urethane molded article with threads shown in FIG. 6 will be described. FIG. 8 is a sectional view of one example of the reaction injection mold used in the production of the reaction injection molded article according to the invention. In FIG. 8, parts similar to those shown in FIG. 6 are designated by like reference characters. The helicoils 12 are located in the boss forming regions 10A of the cavity 10 as being threadably fitted over bolts 13 formed of steel each having a head 13A inserted in one of recesses 9B formed in the lower mold member 19.

Figure 5:
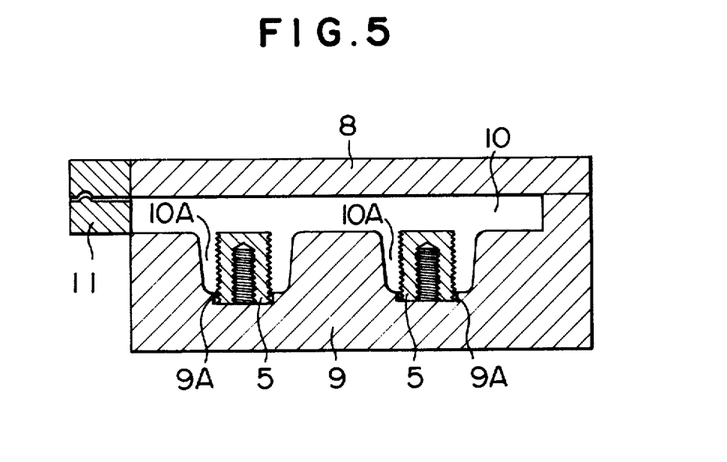
FIG. 5 is a sectional view of the mold used for producing the molded article shown in FIG. 1.

The method of production of the molded article using the reaction injection mold shown in FIG. 8 is similar to that using the reaction injection mold shown in FIG. 5. By removing the bolts 13 from the body 1A of the molded article, the body 1A of the molded article shown in FIG. 6 is obtained.

In the mold shown in FIG. 8, the bolt 13 is threadably inserted in the helicoil 12, so that the material in the vicinity of the helicoils 12 in the bosses 2A is quickly cooled by the helicoils 12 and bolts 13, to enable the hard and thick skin layer 4 to be formed on the outer side of each of the helicoils 12.

Figure 9:
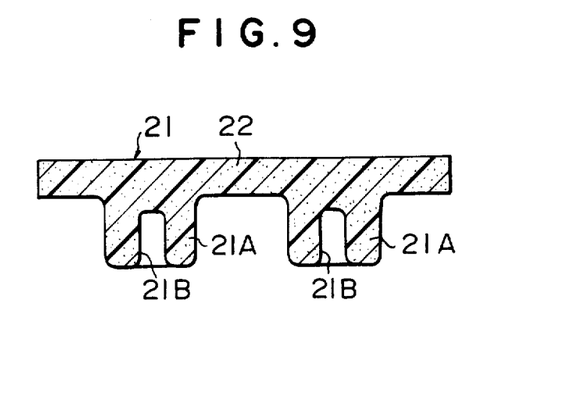
FIG. 9 is a sectional view of the body of the molded article comprising still another embodiment.

Still another embodiment of the invention will be described by referring to FIG. 9 in which the numeral 21 designates a reaction injection molded article body consisting of a core 22 of the cell construction including bosses 21A each formed with a hole 21B to be threaded later on. The cell construction in the vicinity of the holes 21B of the molded article body 21 has a higher density than the cell construction in the central portion of the body 21 due to the cooling effect of the mold, not shown.

The reaction injection molded article body 21 which is of the cell construction is formed by using a foaming system using water and alkylhalide as foaming agent.

Figure 7:
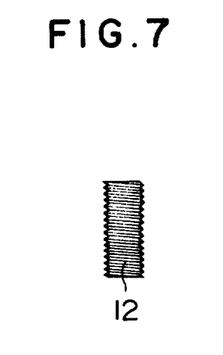
FIG. 7 is a sectional view, on an enlarged scale, of the helicoil used in the embodiment shown in FIG. 6.
Figure 10:
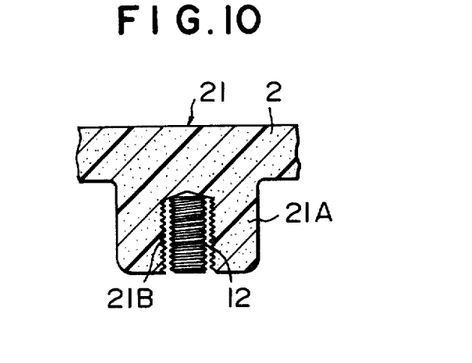
FIG. 10 is a sectional view, on an enlarged scale, of the essential portions of the molded article shown in FIG. 9 which is further worked after being molded.

The reaction injection molded article body 21 of this construction can be readily formed with female threads by cutting threads of the helicoil 12 shown in FIG. 7 on the walls of the holes 21B of the body 21 by means of a helicoil tap, not shown, and then threadably fitting the helicoils 12 in the threaded holes 21B as shown in FIG. 10.

Figure 11:
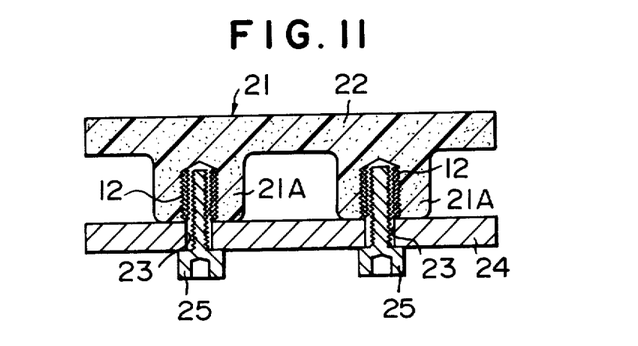
FIG. 11 is a sectional view of the molded article shown in FIG. 10 and an attachment secured to the molded article.

An attachment can be attached to the reaction injection molded article by utilizing the female threads formed as aforesaid. As shown in FIG. 11, an attachment 24, such as a steel plate, formed with bolt holes 23 of a predetermined size is brought into contact with the body 21 with the bolt holes 23 being indexed with the holes 21B in the bosses 21A and then bolts 25 are threadably inserted in the helicoils 12 in the holes 21B. The threads of the embodiment shown in FIG. 11 had a screw clamping critical torque of about 20 kg-cm.

Figure 12:
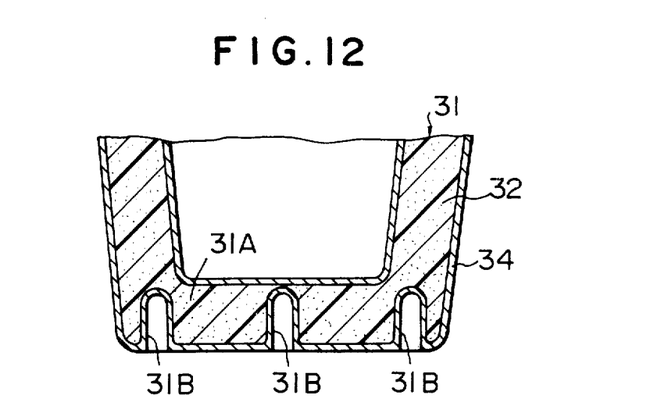
FIG. 12 is a sectional view of the essential portions of the body of the molded article comprising still another embodiment.

Still another embodiment of the invention will be described by referring to FIGS. 12–14. In these figures, parts similar to those shown in FIGS. 10 and 11 are designated by like reference characters.

The reaction injection molded article body 31 shown in FIG. 12 comprises a skin layer 34 of high density formed on its underside 31A with holes 31B to be subsequently threaded located at the outside, and a core 32 of the cell constriction of low density located in the interior.

The reaction injection molded article body 31A of the dual layer structure comprising the skin layer 31A on the outside and the core 32 of the cell construction in the interior is formed by using a foaming system consisting of a foaming agent, such as low boiling alkylhalide, for example.

Figure 13:
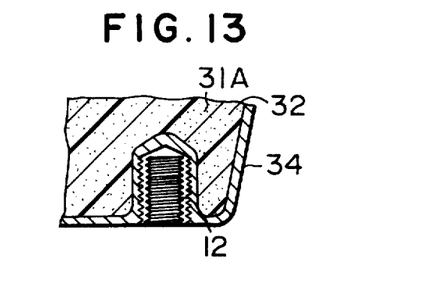
FIG. 13 is a sectional view, on an enlarged scale, of the essential portions of the molded article including the body of the molded article shown in FIG. 9 which is further worked.
Figure 14:
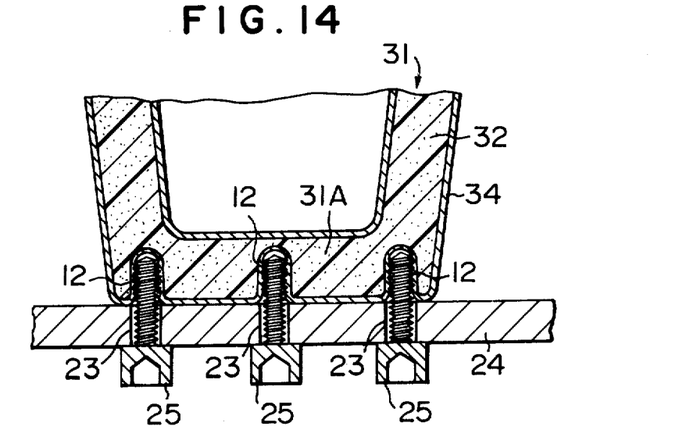
FIG. 14 is a sectional view of the molded article shown in FIG. 12 and an attachment secured thereto.

Then threads are cut on the wall of the hole 31B of the skin layer 34 of high density of the molded article body 31 as shown in FIG. 13 by means of a helicoil tap, not shown, and helicoils 12 as shown in FIG. 7 are threadably inserted in the holes 31B. Thus the reaction injection molded article body 31A can be readily formed with female threads.

An attachment can be attached to the reaction injection molded article by utilizing the female threads formed as aforesaid. As shown in FIG. 14, the attachment 24 formed with the bolt holes 23 of a predetermined size made as of steel plate is brought into contact with the body 31 with the bolt holes 23 being indexed with the heles 31B on the underside 31A of the reaction injection molded article body 31. Then the bolts 25 are threadably inserted in the helicoils 12 in the holes 31B, to thereby secure the attachment 24 to the reaction injection molded article.

In the embodiment shown and described hereinabove, the helicoils 12 are threadably inserted in the holes 31B formed in the skin layer 34. Thus the threads of this embodiment have a higher screw clamping critical torque than those of the embodiments shown and described previously which was about 30 kg-cm. It has been found that when a three-component system comprising 4, 4'-diaminodiphenylmethane added with propylene oxide (40 weight parts), glycerine added with propylene oxide and ethylene oxide (10 weight parts) and monoethanol amine added with propylene oxide (50 weight parts) is used as the polyol of the urethane foaming material, the foamed body obtained has its mechanical strength increased by about 20–30% and its thermal resistance also increases by 30–50%. It has also been found that crude MDI used as the B liquid has increased reactivity with polyol and raises no problem with regard to safety.

In all the embodiments shown and described hereinabove, the threaded inserts and the helicoils have been described as being made of steel. However it is to be understood that other metal or nonferrous metal and plastics of high toughness, such as ABS, may be used. The reaction injection molded article has been described by referring to a foamed urethane molded article. However, the invention is not limited to the foamed urethane molded article and it can have application in other reaction injection molded articles.

What is claimed is:

1. A reaction injection molded article of a foamed polyurethane resin material, formed by mixing and foaming an A liquid and B liquid, the A liquid comprising a polyol, a catalyst and a foaming agent, the B liquid comprising polyisocyanate, comprising:
   a molded article of said foamed polyurethane resin material, having a surface layer of density of 0.5–1.1 g/cm$^3$, said surface layer being a skin layer of the polyurethane resin material, with substantially no foaming action having taken place in said skin layer, said molded article body having holes enclosed by said surface layer; and
   female threaded members each inserted in one of said holes, said members being held in place rigidly by said surface layer.

2. A reaction injection molded article as claimed in claim 1, wherein said members are made of metal or plastics of high toughness.

3. A reaction injection molded article as claimed in claim 2, wherein said members are cylindrical in shape and formed with the female threads on the inside and have irregularities on the outside.

4. A reaction injection molded article as claimed in claim 3, wherein said irregularities are threads or knurlings.

5. A reaction injection molded article as claimed in claim 2, wherein said members are polygonal in shape and formed with the female threads on the inside and lateral grooves on the outside.

6. A reaction injection molded article as claimed in claim 1, wherein said members are helicoils.

7. A reaction injection molded article as claimed in claim 1, wherein the density of the molded article body other than the surface layer is 0.05–0.2 g/cm$^3$.

8. A reaction injection molded article as claimed in claim 1, wherein the members have irregularities on the outside surface thereof enabling said members to be held in place by the surface layer.

9. A reaction injection molded article as claimed in claim 8, wherein the surface layer has a higher density than the remainder of said molded article body.

10. A reaction injection molded article as claimed in claim 1, wherein the surface layer has a higher density than the remainder of said molded article body.

11. A reaction injection molded article of a foamed polyurethane resin material, formed by mixing and foaming an A liquid and a B liquid, the A liquid containing 100 weight parts of polyether polyol, 1–5 weight parts of a catalyst, 8–30 weight parts of a low boiling point foaming agent, and the B liquid containing 100–200 weight parts of MDI, TDI, crude MDI or crude TDI, comprising:
   a molded article body of said foamed polyurethane resin material, having a surface layer of density of 0.5–1.1 g/cm$^3$, said surface layer being a skin layer of the polyurethane resin material, with substantially no foaming action having taken place in said skin layer, said molded article body having holes enclosed by said surface layer; and
   female threaded members each inserted in one of said holes, said members being held in place rigidly by said surface layer.

12. A reaction injection molded article as claimed in claim 11, wherein said polyether polyol is obtained by adding alkylene oxide to an alcohol or amine, and said low boiling point foaming agent is a low boiling point alkylhalide.

13. A reaction injection molded article as claimed in claim 12, wherein said low boiling point foaming agent is trichlorofluoromethane.

14. A reaction injection molded article as claimed in claim 12, wherein said polyether polyol is obtained by adding propylene oxide to 4,4'-diaminodiphenylmethane, propylene oxide and ethylene oxide to glycerine, and propylene oxide to monoethanol amine.

15. A reaction injection molded article as claimed in claim 14, wherein said B liquid is crude MDI.